Figure 1:
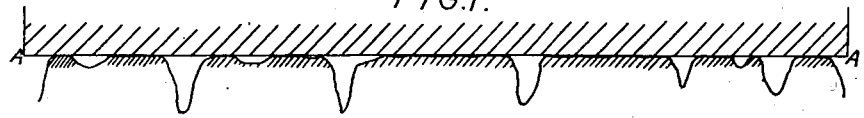

June 21, 1949.  H. SHAW  2,474,015
INSTRUMENT FOR THE MEASUREMENT OF SURFACE FINISHES
Filed Feb. 14, 1945

Inventor
Harry Shaw
By
Michael ... agent

Patented June 21, 1949

2,474,015

UNITED STATES PATENT OFFICE 2,474,015

INSTRUMENT FOR THE MEASUREMENT OF SURFACE FINISHES

Harry Shaw, Healy, Whitworth, Rochdale, England

Application February 14, 1945, Serial No. 577,808
In Great Britain January 22, 1945

4 Claims. (Cl. 73—105)

This invention relates to the measurement of surface roughness, for example, in order to check the uniformity of surfaces, and to determine, whether a surface has a type of finish suitable for a predetermined purpose.

It has been proposed to construct instruments which record graphically the shape of the surface finish, generally upon a much magnified scale, and also to obtain an indication of the maximum depth of roughness or of the average depth of roughness. Various methods of defining the average roughness are used in different instruments, some giving it as a root-mean-square average height, others as an arithmetical average height. Again the datum line from which the average height has been calculated has been variously positioned, some placing it where the areas of projections above the line equal the areas of depression below the line, while it has been positioned where it touches the most prominent peaks and also where it touches the lowermost valleys.

While for many purposes these systems may be useful and give a good guide, there are other purposes for which such a system of measurement and definition may be misleading.

A surface consisting of a generally level surface with occasional deep sharp pits in it, could give the same average height, measured by some of the systems mentioned, as could a surface generally flat but having occasional sharp high hills on it. Obviously as bearing or wearing surfaces such surfaces have widely different values.

For many purposes it would be convenient to know what area of the surface will make contact with a flat plane, contacting either with the existing surface, or with the surface after a predetermined amount of wear has taken place.

It is the object of the present invention to provide an instrument capable of giving easily and rapidly, and without the need for destroying the surface, an indication or recording of a measure of the surface that will make contact with a plane touching the surface or with a plane parallel to, but at a predetermined distance from, this plane.

According to the invention an instrument for the measurement of surface roughness may be so constructed that an indication and/or recording is obtained of the length or area of material phase contacting with a flat plane resting on the surface being tested, or cut through by a reference plane parallel to said flat plane along a line, or along a line or lines covering said area. Alternatively the instrument may be so constructed that an indication and/or recording is obtained of the length or area of the air phase cut through by a flat plane resting on the surface being tested, or by a reference plane parallel to said flat plane, along a line, or along a line or lines covering said area.

Preferably the length or area indicated and/or recorded is so indicated or recorded in relation to the complementary air or material phase, or the total of air and material phases.

An instrument according to the invention includes a stylus adapted to travel over the surface to be tested and adapted to move in a direction at right angles to the plane of a flat plane resting on said surface, in combination with means for measuring the period of time or length of traverse during which said stylus moves at right angles to said flat plane, either above or below said plane, or a reference plane parallel thereto, according as the material or air phase is being indicated or recorded.

Various methods are possible for converting the stylus movements into recordings or readings. For example movements of the stylus normal to the flat plane or the reference plane may be adapted to operate an electrical pick-up system, piezo-crystal pick-up system, electrostatic pick-up system, or an electro-magnetic pick-up system, the generated or modulated output of which operates a suitable indicating and/or recording device.

The invention will be more fully comprehended with the aid of the accompanying drawings which illustrate the principles of the invention and how it may be carried into practice.

In the drawings—

Figure 2:
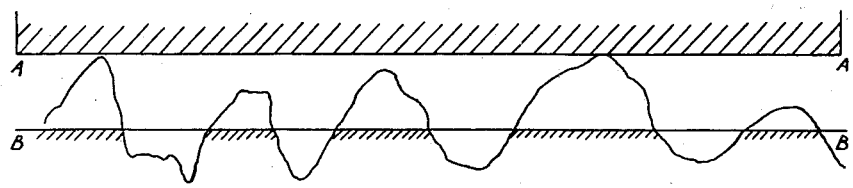
Figure 3:
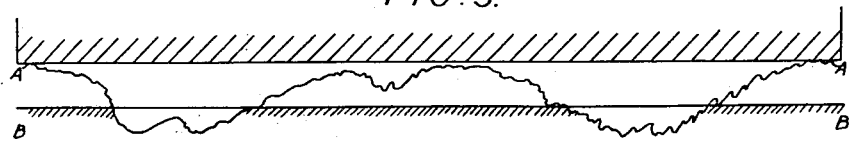
Figure 4:
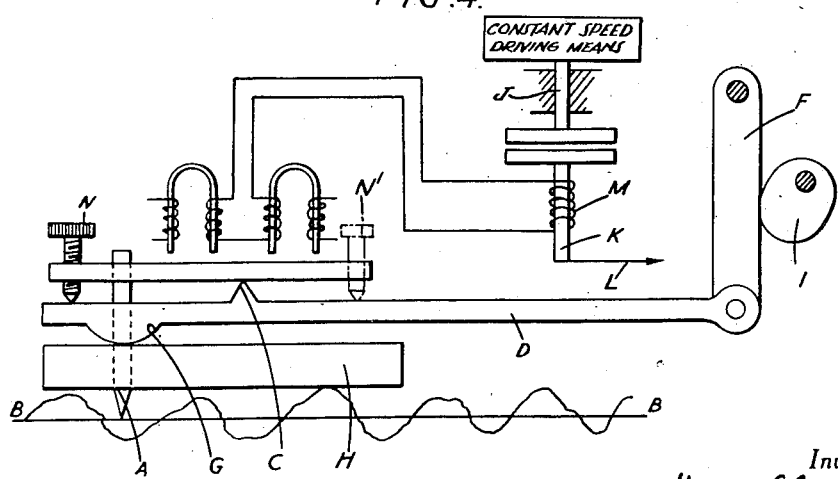

Figures 1, 2 and 3 illustrate diagrammatically three types of surface roughness with a flat plane resting thereon, and Figure 4 illustrates diagrammatically, by way of example, one construction or arrangement of apparatus for carrying the invention into practice, as applied to the indication of the material phase cut through by the flat plane or a reference plane parallel thereto.

If the surface has a cross-section as depicted in Figure 1, the surface finish may be defined by the summation of the lengths indicated by shade lines as touching the contact surface A—A, while if it is of the type indicated in Figure 2 it may be defined by the summation of the lengths indicated by shade lines as touching or cut through by the line B—B parallel with the line A—A of contact surface level.

Should the surface have both a general wavyness and a roughness, as in Figure 3, then if the contacting surface will bridge tthe wavyness, definition of the surface by the summation of the shaded lengths of the line B—B would probably be necessary.

In accordance with this invention, in the case of a surface such as shown in Figure 1, the duration or length of the voids below the plane A—A are measured, i. e. the summation of the air phases in a traverse of the surface, in relation to the total distance of traverse. In the case, however, of surfaces such as shown in Figures 2 and 3, the duration or length of the shaded sections along thte planes B—B parallel to the surface contact plane A—A, i. e. the summation of the material phase lengths cut through in a traverse of the surface, are measured in relation to the total distance of traverse.

The distance of the line B—B from the line of contact surface level A—A at which it is desired to obtain the summation of the lengths cut through by the reference plane will depend upon the purpose for which the surface is to function.

It will be realised that we have considered only the profile or section of the surface along a line. In fact we must consider the average results obtained from a number of sections in arriving at the total area cut through by the reference plane, i. e. the surface contact plane or a plane parallel thereto.

In one instrument for carrying the invention into practice as applied to the measurement of the material phase, stylus A Figure 4 is traversed across the surface to be tested so that its point, if not deflected by the material phase of the surface, would keep on the line B—B, hereinafter called the natural path of the stylus point, parallel with the contact level of the surface, and by suitable means we indicate or record either the summation of the time periods, or lengths or traverse, during which the stylus point keeps, or does not keep, to its natural path.

To those skilled in the art many means by which the required indication may be obtained will be evident. Of the optical, mechanical, pneumatic, hydraulic, magnetic, electromagnetic or electrical methods possible, by way of example an electrical or electro-magnetic method only will be herein described.

The stylus A Figure 4 is pivoted at the point C so as to be free to move in a direction normal or substantially normal to the surface to be tested. The stylus is so guided across the surface so as to keep the natural path of its point in some line B—B. A convenient way of doing this is to form the pivot C on an arm D suspended at one end on a link F and supported at its end nearest the stylus by a skid or rider G resting on a reference surface H formed with two parallel and smooth faces, one of which makes contact with the surface to be tested. The position of the stylus point in relation to the skid G is so adjusted, say by the screw N, that the natural path of the stylus point is positioned at the desired distance from the face of the reference surface that rests in contact with the surface being tested. The stylus may be moved over the surface by a suitable cam I.

The vertical movement of the stylus relative to the surface is caused to generate or modulate a current in a pick-up device which may be of the electro-dynamic, piezo-electric, electro-static, or electro-magnetic type. The generated or modulated current is supplied to a suitable device to give thet required indication or recording. A suitable device consists of a shaft J rotating at a constant speed and a shaft K normally stationary and bearing a pointer L.

When current supplied from the pick-up is supplied to a coil M, after amplification, if necessary, the shaft K becoming magnetised connects to shaft J and is driven, moving the pointer L. By suitable control thte generated or modulated current can be arranged to cause connection of the shafts together only for those periods during which the stylus moves out of its natural path. For example, if a self-generating pick-up is used then current will only be generated when the stylus is moving out of its natural path.

The angular distance through which the pointer L moves will represent the summation of the lengths of traverse during which the stylus is moved out of its natural path.

If the turning of the shaft J is synchronised with the traverse of the stylus, the angle through which the pointer L turns relative to the angle through which the shaft J turns, represents the summation of the material phases cut through by the natural path of the stylus point, relative to the total length of the natural path.

To obtain an average reading representative of the area of a surface the average of a number of individual readings of a surface may be taken, whilst also the stylus may be moved over the surface in a number of closely spaced straight parallel lines or in a number of concentric circular paths or in a continuous spiral path.

The above described instrument may readily be modified for measurement of the air phase below the reference plane, which, as hereinbefore indicated, may be the surface contact plane as in Figure 1, or a plane below said surface contact plane. It is only necessary to provide a stylus mechanism which is responsive to downward movement of the stylus in relation to the reference plane, instead of to upward movements as in the case of Figure 4. For example, the adjustable stop screw N may be provided at the opposite end of the bar carrying the stylus A, as is indicated by the dotted lines at $N^1$, so that the stylus is free to move below the plane B—B but can only move above the said plane by bodily lifting the free end of the lever D when current is not generated or modulated in the pick-up.

What I claim and desire to secure by Letters Patent is:

1. A device for determining the roughness of a surface having peaks and valleys comprising a support adapted to rest upon the peaks of said surface, means for traversing said support over said peaks of said surface, a stylus for engaging said surface carried by said support and movable relative thereto in a direction normal to the plane of movement of the support, means actuated by movement of the stylus relative to the support independently of the extent of such movement, and means for summating the periods of such actuation.

2. A device for determining the roughness of a surface having peaks and valleys comprising a support adapted to rest upon the peaks of said surface, means for traversing said support over said peaks of said surface, a stylus for engaging said surface carried by said support and movable relative thereto in a direction normal to the plane of movement of the support, time summating means having an operative condition and an inoperative condition and means responsive to movement of the stylus relative to the support for actuating said time summating means from one of said conditions to the other.

3. A device for determining the roughness of a surface having peaks and valleys comprising a support adapted to rest upon the peaks of said surface, means for traversing said support over said surface, a stylus for engaging said surface carried by said support and movable relative thereto in a direction normal to the plane of movement of the support, a continuously moving member, a normally stationary member, and means responsive to a displacement of the stylus relative to the support for connecting said normally stationary member to said moving member during the periods of such displacement.

4. A device for determining the roughness of a surface having peaks and valleys comprising a support adapted to rest upon the peaks of said surface, means for traversing said support over said surface, a stylus having a tip which projects from said support towards said surface but does not reach to the valleys of said surface, said stylus being displaceable relative to the support by the engagement of said tip with the peaks of said surface during the traversing movement, means actuated by movement of the stylus relative to the support independently of the extent of such movement and means for summating the periods of such actuation.

HARRY SHAW.

REFERENCES CITED

The following references are of record in the file of this patent:

UNITED STATES PATENTS

| Number | Name | Date |
|---|---|---|
| 2,020,548 | Harrison | Nov. 12, 1935 |
| 2,171,433 | Powers | Aug. 29, 1939 |
| 2,240,278 | Abbott | Apr. 29, 1941 |
| 2,305,264 | Leonard | Dec. 15, 1942 |
| 2,335,390 | Crist | Nov. 30, 1943 |
| 2,344,217 | Reason et al. | Mar. 14, 1944 |
| 2,404,143 | Reason | July 16, 1946 |